Inventor:—
Leon R. Van Steenburgh, Jr.

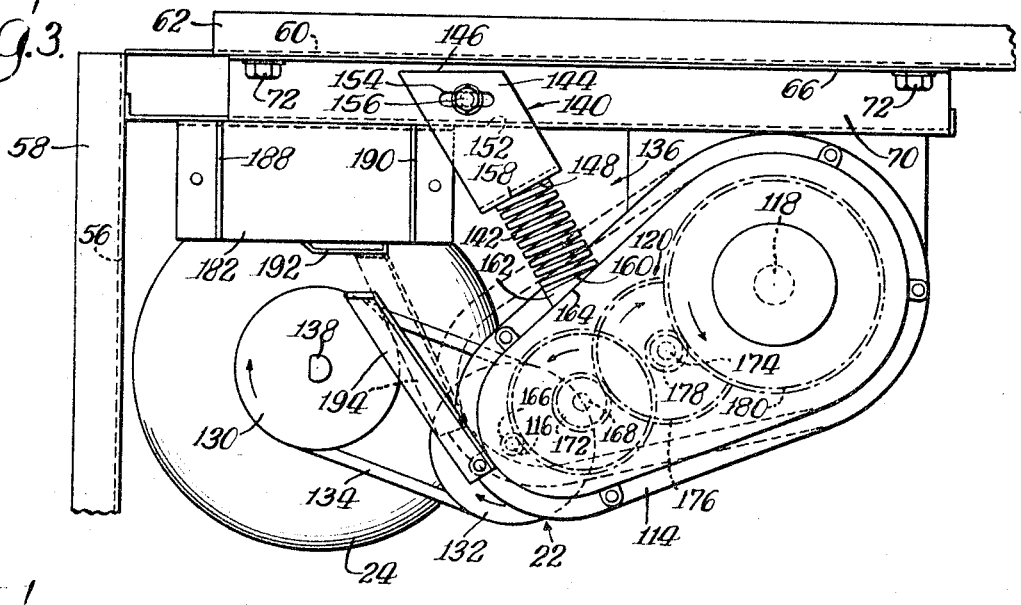

United States Patent Office 3,449,920
Patented June 17, 1969

3,449,920
ICE AUGER WITH SLIP DRIVE
Leon R. Van Steenburgh, Jr., Manitowoc, Wis., assignor to The Manitowoc Co., Inc., Manitowoc, Wis., a corporation of Wisconsin
Filed Jan. 12, 1968, Ser. No. 697,357
Int. Cl. F25c 1/12, 5/02
U.S. Cl. 62—136                      14 Claims

ABSTRACT OF THE DISCLOSURE

In ice forming apparatus including a component which is movable within a water freezing chamber, the improvement wherein transmission means for drivably moving the movable component from a prime mover is arranged to slip upon freezing of water within the freezing chamber to an extent preventing free movement of the component, means preferably being provided for thereupon promoting thawing of the ice in the freezing chamber and thereby promoting freeing of the component.

BACKGROUND OF THE INVENTION

This invention relates generally to refrigeration and more particularly to improvements in ice forming apparatus.

The principles of this invention may be applied to any form of ice forming apparatus including a water freezing chamber, a refrigerating system for effecting formation of ice in the freezing chamber, a component movable within the freezing chamber, and a prime mover for moving the component. One common form of ice forming apparatus to which an improvement may be made according to the principles of this invention comprises a freezing chamber having a water inlet and an ice outlet and having a cylindrical freezing surface, a refrigerating system for effecting formation of ice on the freezing surface from water introduced through the water inlet, an auger rotatably mounted within the freezing chamber and adapted to remove ice from the freezing surface and to eject the removed ice through the ice outlet, a prime mover for rotatably driving the auger, and transmission means for rotatably driving the auger from the prime mover.

It is characteristic of some ice forming apparatus of this common form that the auger cooperates with the freezing chamber to compact the ice, which when first removed from the freezing surface by the auger may be water-laden and slushy, and to fracture the compacted ice into chipped ice.

The refrigerating system characteristically embodies a conventional refrigeration cycle and comprises a compressor for compressing refrigerant, a condenser for condensing refrigerant from the compressor, an expansion valve for expanding refrigerant from the condenser, and an evaporator for evaporating refrigerant from the expansion valve. The evaporator is arranged to absorb heat from the freezing surface of the freezing chamber and thereby to effect formation of ice on the freezing surface. The transmission means characteristically comprises a transmission housing, which is rigidly supported with respect to the freezing chamber, and a gear train, which is operatively mounted within the transmission housing and which positively drives the auger from the prime mover, the transmission housing being rigidly mounted to the framework of the apparatus. The prime mover may be a single-speed electrical motor in which instance the gear train would be arranged to step down the rotary speed, for example, from 1750 r.p.m. to 12 r.p.m., and the output shaft of the gear train may be positively coupled to the auger for conjoint rotation therewith.

The reaction of the auger of such an ice forming apparatus during ice removal at or near the designed rotary speed is considered to be "free rotation of the auger," as such term and terms of like import are used herein. It should be undrestood that free rotation of the auger may be prevented during ice removal by excessively hard or thick ice formed around the auger in the freezing chamber, by foreign matter in the freezing chamber, or by other causes, in which instances the auger becomes jammed and thus partly or completely braked within the freezing chamber. It is not necessary for the auger to be completely stopped for free rotation to be prevented. In any of these instances, a mechanical failure may occur in the form of a resulting fracture, break, or shear at the coupling between the output shaft of the gear train and the auger, at one or more gear teeth of the gear train, or at some other vulnerable part or parts of the ice forming apparatus. One probable cause of such a mechanical failure in an ice forming apparatus in which the prime mover is an electrical motor is the so-called flywheel effect of the rotor of the electrical motor, which rotor has a large moment of inertia and thereby stores energy in the manner of a flywheel. The likelihood of such mechanical failure to occur is heightened by the rotary speed differential between the electrical motor and the auger. It may not be necessary for the auger to be completely stopped for damage of this sort to occur.

Similar damage may be caused if the ice forming apparatus is started while the auger is jammed within the freezing chamber. This condition commonly is produced by equalization of the refrigerating system and consequent residual freezing of the water remaining in the freezing chamber after the apparatus has been shut off for a short period of time. In this instance as well, it may not be necessary for the auger to be completely stopped for such damage to be caused. This condition frequently occurs in an ice forming apparatus having an ice collecting bin and having means for automatically shutting off the apparatus when the bin is filled and automatically restarting the apparatus upon removal of ice from the bin.

Furthermore, similar damage may be caused by ratcheting of the auger within the freezing chamber. In an instance of ratcheting, the auger does not become stopped within the freezing chamber, but intermittent, often severe shocks are transmitted from the auger through the transmission means back to the prime mover. Such ratcheting may be caused by the auger fracturing hard or thick ice from the freezing surface of the freezing chamber.

In some other form of ice forming apparatus, similar damage may occur from jamming either of an auger or of some other movable component within the freezing chamber of the apparatus, from starting the apparatus while such movable component is jammed within the freezing chamber, or from ratcheting of such movable component within the freezing chamber.

SUMMARY OF THE INVENTION

It is one object of this invention to eliminate damage in an ice forming apparatus from jamming of a movable component within the freezing chamber of the apparatus during operation of the apparatus.

It is another object of this invention to eliminate damage in an ice forming apparatus from starting the apparatus while a movable component is jammed within the freezing chamber of the apparatus.

It is another object of this invention to eliminate damage in an ice forming machine from ratcheting of a movable component within the freezing chamber of the apparatus.

3

To attain these objects, there may be provided, for drivably moving the movable component within the freezing chamber of the ice forming apparatus, transmission means arranged to slip upon jamming of the movable component within the freezing chamber during operation of the apparatus, upon starting of the apparatus while the movable component is jammed within the freezing chamber, or upon ratcheting of the movable component within the freezing chamber. In addition, means may be provided for promoting thawing of the ice in the freezing chamber and thereby promoting freeing of the movable component upon formation of ice in the freezing chamber to an extent preventing free movement of the component.

In view of the foregoing, an ice forming apparatus of the earlier mentioned common form may be characterized by certain novel features.

It is one such feature that the transmission means may comprise a transmission housing, an input shaft and an output shaft respectively journalled to the transmission housing in generally parallel relationship, a gear train arranged within the transmission housing to positively drive the output shaft from the input shaft, a first pulley arranged to be driven by the prime mover and a second pulley fixed to the input shaft, an endless belt engaging the first and second pulleys so as to drive the second pulley from the first pulley, and resilient biasing means for rotatably biasing the transmission housing upon the output shaft so as to tighten the endless belt against the first and second pulleys. The axis of the output shaft is fixed with respect to the axis of the first pulley. The endless belt is arranged to be loosened and thereby permitted to slip upon rotation of the transmissioin housing upon the output shaft against the bias imposed by the biasing means.

The gear train comprises an output gear fixed to the output shaft and a driving gear arranged to drive the output gear. By this arrangement, upon braking of the output shaft while the input shaft is driven by the prime mover, the drive gear is forced to orbit around and upon the output gear thereby to cause the transmission having to be rotated upon the output shaft against the biasing means.

It is another such feature that the ice forming apparatus may further comprise by-pass means including valve means and being effective when the valve means is closed for maintaining normal operation of the refrigerating system and effective when the valve means is opened for by-passing the condenser and the expansion valve and diverting refrigerant from the compressor directly to the evaporator, and valve control means for opening the valve upon otation of the transmission housing upon the output shaft against the bias imposed by the biasing means. Refrigerant from the compressor passing directly to the evaporator promotes thawing of ice in the freezing chamber.

The valve control means may comprise electrical circuit means including a normally opened safety switch arranged to be closed upon rotation of the transmission housing upon the output shaft against the bias imposed by the biasing means, a lock-in relay energized through the safety switch when the safety switch is closed and deenergized when the safety switch is opened, and a solenoid energized through the lock-in relay when the lock-in relay is in its deenergized state and deenergized when the lock-in relay is in its energized state. The valve means is normally opened, and the solenoid is arranged to close the valve means when energized to restore the valve means when deenergized.

If the prime mover is an electrical motor, the electrical motor may be arranged to be energized through lock-in relay when the lock-in relay is in its deenergized state and to be deenergized when the lock-in relay is in its energized state. By this arrangement, the electrical motor is deenergized upon rotation of the transmission having

4 upon the output shaft against the bias imposed by the biasing means.

The electrical circuit means may further include time-delay switch means for maintaining the lock-in relay in its deenergized state for a time delay following restoration of the normally opened safety switch. A time delay of about one minute is preferred.

An ice forming apparatus embodying the foregoing features is not susceptible to damage in the hereinbefore mentioned instances of jamming of the auger during operation of the apparatus, starting of the apparatus while the auger is jammed, and ratcheting of the auger. In each of these instances, the transmission housing is rotated upon the output shaft against the bias imposed by the biasing means. As a result, the endless belt is loosened and permitted to slip, the electrical motor is deenergized, and refrigerant from the compressor is diverted directly to the evaporator to promote thawing of ice in the freezing chamber. If the auger is freed by thawing of ice in the freezing chamber, the apparatus is restarted after a measured time delay.

These and other objects, features, and advantages of this invention are evident from the following description, with the aid of the attached drawings, of a presently preferred embodiment of this invention.

BRIEF DESCRIPTION OF THE DRAWINGS

In the drawings:
FIGURE 2 is a more detailed elevational view of the ice forming apparatus, with portions of the refrigerating means being omitted and with portions of the apparatus being removed and shown in section;
FIGURE 3 is a top plan view of the ice forming apparatus as shown in FIGURE 2.

DESCRIPTION OF THE PREFERRED EMBODIMENT

*Mechanical features of the apparatus*

Figure 1:
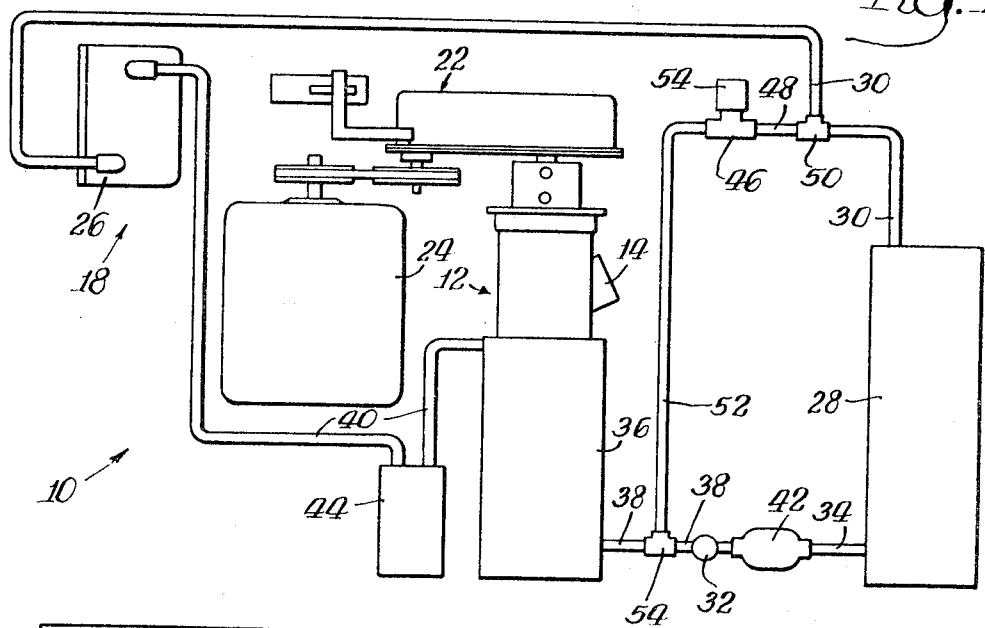
FIGURE 1 is a schematic overall view of an ice forming apparatus embodying the principles of this invention.

As best seen in FIGURES 1, 2 and 3, the ice forming apparatus 10, which constitutes the presently preferred embodiment of this invention, generally comprises a freezing chamber 12 having a water inlet (not shown) and a laterally discharging ice outlet 14 and having a generally cylindrical freezing surface 16. As shown, the freezing chamber 12 is vertically upstanding. However, in a different form of ice forming apparatus also embodying the principles of this invention, the freezing chamber might be horizontally disposed or otherwise oriented. The apparatus 10 further comprises a refrigerating system 18 for effecting the formation of ice on the freezing surface 16 from water introduced through the water inlet, an auger 20 rotatably mounted within the freezing chamber 12 and adapted to remove ice from the freezing surface 16 and to eject the removed ice through the ice outlet 14, and transmission means 22 for rotatably driving the auger 20 from a single-speed electrical motor 24. The ice which is ejected through the ice outlet 14 may be deposited in a conventional collecting bin (not shown) located adjacent to the ice outlet 14.

The refrigerating system 18 embodies a conventional refrigeration cycle and comprises a compressor 26 for compressing refrigerant, a condenser 28, the input of which is connected by conduit means 30 to the output of the compressor 26, for condensing refrigerant from the compressor 26, an expansion valve 32, the input of which is connected by conduit means 34 to the output of the condenser 28, for expanding refrigerant from the compressor 26, and an evaporator 36, the input of which is connected by conduit means 38 to the output of the expansion valve 32, for absorbing heat from the freezing surface 16 of the freezing chamber 12 and thereby effecting the formation of ice on the freezing surface 16. The input of the compressor 26 is connected by conduit means 40 to the evaporator 36 to establish recycling of the refrigerant. In addition, the refrigerating system 18 comprises a conventional drier 42, which is connected between the output of the condenser 28 and the input of the expansion valve 32, and a conventional accumulator 44, which is connected between the output of the evaporator 36 and the input of the compressor 26, and may comprise other conventional auxiliary equipment (not shown). In terms of the refrigerating system 18, the freezing chamber 12 may be considered to be part of the evaporator 36. Because the operation of the foregoing components of the refrigerating system 18 is conventional, no description hereof is included herein.

In accordance wih the principles of this invention, the ice forming apparatus 10 further comprises normally opened valve means 46, the input of which is joined by conduit means 48 opening into a three-way junction 50 to conduit means 30, and the output of which is joined by conduit means 52 opening into a three-way junction 54 to the conduit means 38. The junction 50, the conduit means 48, the valve means 46, the conduit means 52, and the junction 54 form by-pass means by-passing the condenser 28 and the expansion valve 32 in the refrigerating system 18. This by-pass means is effective when the valve means 46 is closed for maintaining normal operation of the refrigerating system 18 and effective when the valve means 46 is opened for diverting refrigerant from the compressor 26 directly to the evaporator 36. Such refrigerant is in a gaseous state and is hot relative to the evaporator 36. In addition, the ice forming apparatus 10 comprises a valve control solenoid 54, which is effective to close the valve means 46 when energized and to restore the by-pass valve 46 when deenergized. Opening of the by-pass valve may be effected with the aid of a conventional internal spring or other suitable means (not shown). The operation of the valve control solenoid 54 is described hereinafter.

In FIGURES 2 and 3, there are shown only fragmentary portions of the framework into which the ice forming apparatus 10 is built for purposes of structural support. These include a side mounting plate 56 having a top flange 58, and an outer back mounting plate 60 having a top flange 62, the top flanges 58 and 62 permitting the respective mounting plates 56 and 60 to be mounted to the roof of an enclosure (not shown) for the apparatus 10. The respective mounting plates 56 and 60 are shown as if formed in one piece. An inner back mounting plate 64, which is formed with stepped-back upper and lower mounting flanges 66 and 68, respectively, has an upper shelf portion 70 adjacent to the upper mounting flange 66 and is fixedly mounted to the outer back mounting plate 60 by means of bolts 72 and 74 engaging the respective upper and lower mounting flanges 66 and 68.

Conventional motor-mounting means (not shown) are provided for fixedly mounting the motor 24 to the side mounting plate 56. The freezing chamber 12 is fixedly mounted to the inner back mounting plate 64 by means of a pair of brackets 76 and 78 which are fixedly mounted to the inner back mounting plate 64 by means of respective bolts 80 and 82. An opening 84 is provided through the back mounting plates 60 and 64 to admit electrical wires (not shown) for the electrical motor 24.

The freezing chamber 12 has a generally cylindrical heat-conductive side wall 86, the lower portion of which embodies the freezing surface 16, and the upper portion of which opens into the laterally discharging ice outlet 14. The evaporator 36 comprises a helical tubular refrigerating coil 88, which is wound around substantially the same lower portion of the side wall 86 and held in place by a supporting enclosure 90. As noted, the freezing chamber 18 may be considered to be part of the evaporator 36. Evaporating refrigerant passing through the refrigerating coil 88, which is connected between the conduit means 38 and the conduit means 40 (FIGURE 1), serves to absorb heat from the freezing surface 16 of the freezing chamber 12 and thereby to effect the formation of ice on the freezing surface 16 from water introduced through the water inlet. If the freezing chamber 12 is vertically upstanding, as shown, ice is formed initially in a generally cylindrical shell pattern on the lower portion of the freezing surface 16 up to the level of water in the freezing chamber 12. A correspondingly different initial freezing pattern results from a different orientation of the freezing chamber 12.

The auger 20 generally comprises a body portion 92, an upper shank portion 94, an upper bearing portion 96, an upper coupling portion 98, a lower shank portion 100, and a lower bearing portion 102. The body portion 92 carries a generally helical blade 104, which closely fits within the generally cylindrical freezing surface 16. The upper bearing portion 96, which is separated from the body portion 92 by the upper shank portion 94, is suitably fitted within the inner race of upper rolling-contact bearing means 106, the outer race of which is suitably fitted within an upper bearing housing 108. The upper bearing housing 108 forms an integral part of the freezing chamber 12. The lower bearing portion 102, which is separated from the body portion 92 by the lower shank portion 100, is suitably fitted within the inner race of lower rolling-contact bearing means 110, the outer race of which is suitably fitted within a lower bearing housing 112. The lower bearing housing 112 forms an integral part of the freezing chamber 12.

Because the manner in which the auger 20 is rotatably mounted within the freezing chamber 12 is conventional, no detailed description thereof is included herein. It should be noted that the upper coupling portion 98 of the auger 20 extends upwardly with respect to the freezing chamber 12. The manner in which the auger 20 cooperates with side wall 86 and the upper bearing housing 108 of the freezing chamber 12 to compact the ice, which when first removed from the freezing surface 16 by the blade 104 of the auger 20 may be water-laden and slushy, and to fracture the compacted ice into chipped ice, is beyond the scope of this invention. Therefore, no description thereof is included herein.

According to the principles of this invention, the transmission means 22 generally comprises a transmission housing 114, an input shaft 116 and an output shaft 118, which are respectively journalled to the transmission housing 114 in generally parallel relationship, and a gear train 120, which is arranged within the transmission housing 114 to positively drive the output shaft 118 from the input shaft 116. The output shaft 118 is positively coupled to the upper coupling portion 98 of the auger 20 by means of a suitable rigid coupling 122, which, as shown, may comprise a connecting sleeve 124 and upper and lower set screws 126 and 128 in diametrically opposed pairs. The set screws 126 and 128 respectively fix the connecting sleeve 124 to the output shaft 118 and to the upper coupling portion 98 of the auger 20.

The transmission means 22 further comprises a first pulley 130 arranged to be driven by the motor 24 and a second pulley 132 fixed to the input shaft 116, an endless belt 134 engaging the first pulley 130 and the second pulley 132 to drive the second pulley 132 from the first pulley 130, and resilient baising means 136 for rotatably biasing the transmission housing 114 upon the output shaft 118 so as to tighten the endless belt 134 against the first pulley 130 and the second pulley 132. The axis of the output shaft 118 is fixed with respect to the axis of the first pulley 130. As shown, the first pulley 130 is fixed to the outwardly extending shaft 138 of the motor 24. The resilient biasing means 136 comprises a generally U-shaped bracket 140 and a coiled compression spring 142. The bracket 140 has an upper mounting portion 144, which has an acutely mitered back edge 146, a generally upstanding portion 148, and a lower bracing portion 150, which is shorter than the upper mounting portion 144 and which has a similarly mitered back edge 152. The upper mounting portion 144 has an elongated slot 154 parallel to the back edge 146 and is adjustably mounted upon the upper shelf portion 70 of the secondary back mounting plate 64 at an acute angle with respect to the secondary back mounting plate 64 by means of a bolt 156 passing through the elongated slot 154. By this arrangement, the back edge 152 of the lower bracing portion 150 of the bracket 140 is braced against the secondary back mounting plate 64. The first end 158 of the coiled compression spring 142 is suitably fastened to the generally upstanding portion 148 of the bracket 140, and the second end 160 thereof is suitably fastened to a generally wedge-shaped pad 162, which may be made of rubber or some other suitable material. The position of the bracket 140 is adjusted along the elongated slot 154 to selectively place the pad 162 into engagement with a side portion 164 of the transmission housing 114 and thereby to selectively bias the transmission housing 114 so as to impose a suitable operating tension on the endless belt 134. To accommodate this biasing, this side portion 164 of the transmission housing 114 is arranged across the path of extension of the coiled compression spring 142. There is no need to secure the pad 162 to the transmission housing 114.

The gear train 120 comprises an input pinion gear 166, which is fixed to the input shaft 116, a first idler shaft 168, which is journalled to the transmission housing 114, a first pinion-driven idler gear 170, which is fixed to the first idler shaft 168 and is driven by the input pinion gear 166, an intermediate pinion gear 172, which is fixed to the first idler shaft 168, a second idler shaft 174, which is journalled to the transmission housing 114, a second pinion-driven idler gear 176, which is fixed to the second idler shaft 174 and is driven by the intermediate pinion gear 172, a driving pinion gear 178, which is fixed to the second idler shaft 174, and an output pinion-driven gear 180, which is fixed to the output shaft 118 and is driven by the driving pinion gear 178. The pinion gears 166, 172, and 178 preferably are formed as teeth on the respective shafts 116, 168, 174, in accordance with conventional practice. The gear train 120, which is operatively mounted in conventional manner to the transmission housing 114 and is arranged to positively drive the output shaft 118 from the input shaft 116, steps down the speed of the single-speed electrical motor 24, typically from 1750 r.p.m. to 12 r.p.m.

Accordingly, in an instance of jamming or ratcheting of the auger 20, as described, the output gear 180 of the gear train 120 is braked, and the driving gear 178 thus is forced to orbit around and upon the output gear 180 as long as the input shaft 116 is driven by the motor 24. Orbiting of the driving gear 178 around and upon the output gear 180 follows a path around the axis of the output gear 180 in the rotary sense that is opposed to the rotary sense in which the driving gear 180 tends to drive the output gear 180; as shown, the driving gear 178 orbits clockwise when the output gear 180 is braked. As the driving gear 178 orbits in the foregoing manner, the transmission housing 114 is rotated by the second idler shaft 174, which is fixed to the driving gear 178 and is journalled to the transmission housing 114. The transmission housing 114 is rotated upon the output shaft 118, which is journalled to the transmission housing 114, against the bias imposed by the biasing means 136. In this manner the endless belt 134 is loosened and thereby permitted to slip. Because the endless belt is permitted to slip, the motor 24 may continue to turn the first pulley 130 without damage to any part of the ice forming apparatus 10.

Because the output shaft 118 is positively coupled to the auger 20, the auger 20 and the output gear 180 rotate conjointly. If the auger is driven clockwise, as viewed in top plan, the biasing means 136 must be arranged to rotatably bias the transmission housing 114 counter-clockwise, but if the auger is driven counter-clockwise, the biasing means 136 must be oppositely arranged, the latter arrangement being employed in the present embodiment, as indicated by the arrows in FIGURE 3.

A normally opened electrical safety switch 182 is held in place adjacent to the upper shelf portion 70 of the secondary back supporting plate 60 by means of a cradle 184. The cradle 184 comprises an elongated angle member 186, which is riveted or otherwise suitably fastened to the secondary back mounting plate 60 in a suitable position to underlie and support the switch 182, a first shorter angle member 188 and a second similar angle member 190, both of which are riveted or otherwise suitably fastened to the elongated angle member 186 in suitably opposed positions to laterally support the switch 182. The normally opened safety switch 182 has an expressible-depressible operating plunger 192, which opens the switch 182 when expressed and closes the switch 182 when depressed. The plunger 192 is biased to its expressed position at which the safety switch 182 is closed. Switches of the foregoing type are conventional.

A switching arm 194, which is fixedly mounted to the transmission housing 114, is effective for depressing the plunger 192 against the bias imposed thereon and thereby closing the safety switch 192 upon rotation of the transmission housing 114 upon the output shaft 118 against the bias imposed by the biasing means 136. Phantom lines in FIGURE 3 indicate the rotated position of the transmission housing 114 at which the switching arm 194 engages and depresses the plunger 192. As shown, some leeway is allowed in order that the switching arm 194 does not engage and depress the plunger 192 upon ratcheting of the auger 20. Such ratcheting of the auger 20 normally is absorbed by the biasing means 136 and followed by immediate restoration of free rotation of the auger 20. However, the switching arm 194 does engage and depress the plunger 192 upon such jamming of the auger 20 as causes the transmission housing 114 to rotatably traverse this leeway. The function of the normally opened safety switch 192 is described hereinafter.

Circuitry of the apparatus

Figure 4:
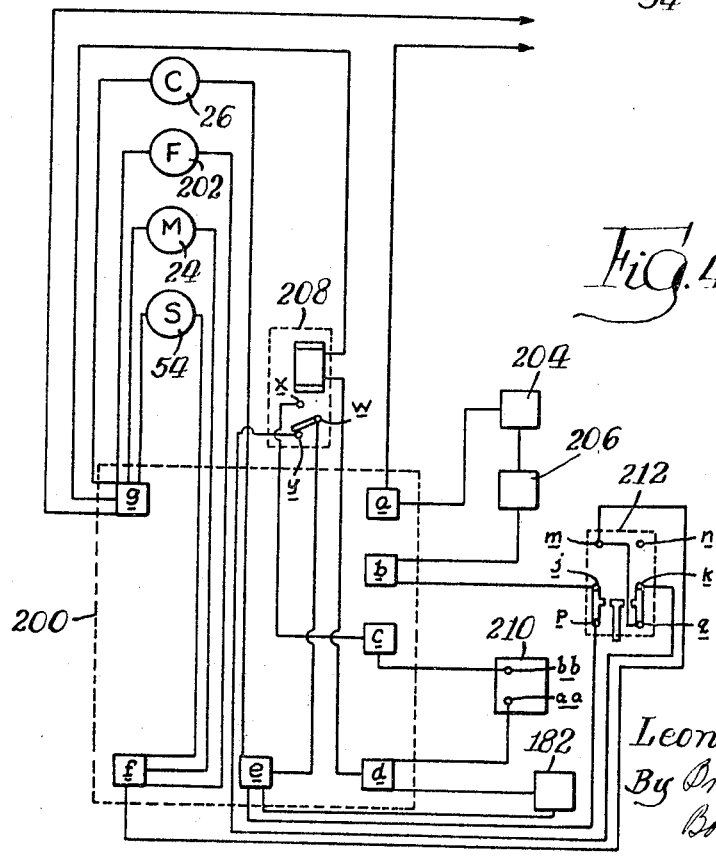
FIGURE 4 is a diagram of the elevational circuitry of the ice forming apparatus.

For convenience, the electrical circuit means 198 of FIGURE 4 is built onto selected terminals *a* through *g* of a wiring board 200, which is outlined in phantom lines. The electrical circuit means 198 incorporates the electrical motor 24, the compressor 26, the valve control solenoid 54, and a conventional electrical fan 202, which may be employed to air-cool the motor 24, each of the foregoing being a two-terminal device, as shown. The electrical circuit means 198 further incorporates the normally opened safety switch 182, as normally closed cut-out switch 204, which may be employed in a conventional manner to cut out upon excessive pressure build-up at the outlet of the compressor 26, another normally closed cut-out switch 206, which may be employed in a conventional manner to cut out upon excessive build up of chipped ice in a conventional collecting bin (not shown), a single-pole double-throw lock-in relay 208, time-delay switch means 210, and a double-pole double-throw control switch 212, which may be employed for normal operational control of the electrical motor 24, the compressor 26, the solenoid 54, and the fan 202. The safety switch 182, the solenoid 54, the lock-in relay 208, and the time-delay switch means 210 serve as valve control means for opening the by-pass valve 46 (FIGURE 1) upon rotation of the transmission housing 114 (FIGURE 3) as hereinbefore described. The safety switch 182, the additional cut-out switches 204 and 206, the lock-in relay 208, time-delay switch means 210, and the control switch 212 are conventional electrical components.

The control switch 212, which may be a conventional toggle switch, comprises pole terminals *j* and *k*, contact terminals m and n, and opposite contact terminals p and q, contact terminals m and q being electrically connected, as shown. It is shown in its operating state, in which pole terminal j is electrically connected to contact terminal p and terminal k is electrically connected to contact terminal q, permitting the motor 24 and the compressor 26 to be energized. It may be switched either to an intermediate cut out or "off" state or to an opposite state. In the opposite state, pole terminal j is electrically connected to contact terminal m and pole terminal k is electrically connected to contact terminal n, permitting the motor 24 but not the compressor 26 to be energized.

The single-pole double-throw lock-in relay 208 comprises pole terminal w and contact terminals x and y, as shown. The lock-in relay 208 is shown in its normal deenergized state, in which pole terminal w is electrically connected to contact terminal y. It is switched to its opposite state, in which pole terminal w is electrically connected contact terminal x, upon energization of the lock-in relay 208. Relays of the foregoing type are conventional.

The time-delay switch means 210 comprises two external terminals, aa and bb, and is energized from terminal aa. When it is energized, it is closed, whereupon terminal bb is placed into electrical connection with terminal aa. When it is deenergized, after a time delay of about one minute, it is opened, whereupon terminal bb is removed from electrical connection with terminal aa. A conventional heater-actuated bi-metallic switch preferably is used for the time-delay switch means 210. Details of the operation of such a switch are outside of the scope of this disclosure.

The respective opposite terminals of a suitable electrical supply (not shown) are electrically connected to terminals a and q of the wiring board 200. The cut-out switches 204 and 206 are electrically connected in series between terminals a and b of the wiring board 200. Pole terminal j of the control switch 212 is electrically connected to terminal b of the wiring board 200. Pole terminal k of the control switch 212 is electrically connected to terminal x of the lock-in relay 208. Contact terminal m of the control switch 212 is electrically connected to terminal f of the wiring board 200.

The compressor 26 is electrically connected between terminals e and q of the wiring board 200. The motor 24, the solenoid 54, and the fan 202 are electrically connected in parallel between terminals f and q of the wiring board 200. In addition to contact terminal x of the lock-in relay 208 being electrically connected to pole terminal k of the control switch 212, contact terminal x of the lock-in relay 208 is electrically connected to terminal c of the wiring board 200, and pole terminal w of the lock-in relay 208 is electrically connected to terminal e of the wiring board 200. Terminals aa and bb of the time-delay switch means 210 are electrically connected between terminals c and d of the wiring board 200. The lock-in relay 208 is electrically connected so as to be energized between terminals d and g of the wiring board 200. The normally closed safety switch 182 is electrically connected between terminals d and e of the wiring board 200.

The functions of the normally closed cut-out switches 204 and 206 are conventional and need not be described in detail. Upon opening of either, the circuit is broken between terminals a and b of the wiring board 200. Hereinafter, the cut-out switches 204 and 206 may be assumed to be closed. The operation of the circuitry 198 may now be described.

If the control switch 212 is switched to its operating state, the motor 24, the valve control solenoid 54, and the fan 202 are energized through a circuit comprising terminal a of the wiring board 200, the cut-out switches 204 and 206, terminal b of the wiring board 200, pole terminal j and contact terminal p of the control switch 212, terminal e of the wiring board 200, pole terminal w and contact terminal x of the lock-in relay 208, pole terminal k and contact terminals q and m of the control switch 212, terminal f of the wiring board 200, the motor 24 in parallel with the solenoid 54 and the fan 202, and terminal g of the wiring board 200. Likewise, the compressor 26 is energized through a circuit comprising terminal e of the wiring board 200, the compressor 26, and terminal g of the wiring board 200. To maintain the circuit for the motor 24, the solenoid 54, and the fan 202, the lock-in relay 208 must remain in its deenergized state.

If the safety switch 182 is closed, as hereinbefore described, the lock-in relay 208 and the time-delay switch means 210 thereby are energized. The lock-in relay 208 thereby is switched to its opposite state, in which the pole terminal w is electrically connected to contact terminal y, whereupon the electrical connection between terminal e of the wiring board 200 and pole terminal k of the control switch 212 is broken. Also, the time-delay switch means 210 is closed, whereupon contact terminal bb is electrically connected to pole terminal aa and terminals c and d of the wiring board 200 are electrically connected. As a result, the motor 24, the solenoid 54, and the fan 202 are deenergized, the compressor 26 remaining energized and the normally opened valve means 46 (FIGURE 1) being restored to its opened state to divert hot gaseous refrigerant directly to the evaporator 36.

If the closing of the safety switch 182 results from freezing of ice around the auger 20 within the freezing chamber 12 (FIGURE 3), as hereinbefore described, the hot gaseous refrigerant may be expected to quickly thaw the ice around the auger 20. If the closing of the safety switch 182 results from other jamming of the auger 20 within the freezing chamber 12, the attention of the operator is required.

In an instance of freezing of ice around the auger 20, the biasing means 136 returns the transmission housing 114 to its normal unrotated position after sufficient thawing of the ice to free the auger 20 (FIGURE 3), whereupon the safety switch 182 is restored to its opened state. This results in deenergization of the time-delay switch means 210. The lock-in relay 208 thereafter remains locked in its energized state through a circuit comprising terminal e of the wiring board 200, pole terminal w and contact terminal y of the lock-in relay 208, terminal c of the wiring board 200, terminals bb and aa of the time-delay switch means 210, and terminal d of the wiring board 200, for about one minute after deenergization of the time-delay switch means 210. After this one minute delay, the time-delay switch means 210 is opened, whereupon the electrical connection between contact terminal bb and pole terminal aa is broken and the lock-in relay 208 thereby is deenergized. This results in energization of the motor 24, the fan 202, and the solenoid 54, whereupon the by-pass valve 46 (FIGURE 1) is restored to its closed state. If desired, the time-delay switch means 210 may be omitted, and a simple cut-out switch used in place of the safety switch 182.

If the control switch 212 is switched to its opposite state, the motor 24, the valve control solenoid 54, and the fan 202 are energized through a circuit comprising terminal a of the wiring board 200, the cut-out switches 204 and 206, terminal b of the wiring board 200, pole terminal j and contact terminal m of the control switch 212, terminal f of the wiring board 200, the motor 24 is parallel with the solenoid 54 and the fan 202, and terminal g of the wiring board 200. This arrangement is provided for convenience in testing and repairing.

*Conclusion*

It is evident from the foregoing description of a preferred embodiment of this invention that the objects of this invention may be attained in a simple reliable manner by improvements according to the principles of this invention in an ice forming apparatus of the particular common form described.

However, this invention should not be limited to the preferred embodiment thereof, in view of changes which hereafter may be made and variations which are now known in ice forming apparatus to which improvements may be made according to the principles of this invention, and in view of other adaptions and modifications of these improvements which may be suggested by this disclosure to those skilled in the art and which properly come within the scope of this invention as set forth in the following claims.

I claim:

1. In an ice forming apparatus including a water freezing chamber, a refrigerating system for effecting formation of ice in said freezing chamber, a component rotatably mounted and movable within said freezing chamber, and a prime mover for moving said component, the combination of first means for interrupting the movement of said component upon formation of ice in said freezing chamber to an extent preventing free movement of said component within said freezing chamber, and second means for promoting thawing of ice in said freezing chamber upon formation of ice to said extent and thereby promoting freeing of said component, said first means comprising transmission means between said component and said prime mover for rotatably driving said component from said prime mover, said transmission means comprising a transmission housing, an input shaft and an output shaft respectively journalled to said transmission housing in generally parallel relationship, a gear train arranged within said housing to positively drive said output shaft from input shaft, a first pulley arranged to be driven by said prime mover and a second pulley fixed to said input shaft, an endless belt engaging said first and second pulleys so as to drive said second pulley from said first pulley, and resilient biasing means for rotatably biasing said transmission housing upon said output shaft so as to tighten said endless belt against said first and second pulleys, the axis of said output shaft being fixed with respect to the axis of said first pulley, said endless belt arranged to be loosened and thereby permitted to slip upon rotation of said transmission housing upon said output shaft against the bias imposed by said biasing means.

2. The combination in an ice forming apparatus according to claim 1, wherein said gear train comprises an output gear fixed to said output shaft and a driving gear arranged to drive said output gear, whereby, upon braking of said output shaft while said input shaft is driven by said prime mover, said drive gear is forced to orbit around and upon said output gear thereby to cause said transmission housing to be rotated upon said output shaft against the bias imposed by said biasing means.

3. The combination in an ice forming apparatus according to claim 1, in which apparatus said refrigerating system comprises a compressor for compressing refrigerant, a condenser for condensing refrigerant from said compessor, an expansion valve for expanding refrigerant from said condenser, and an evaporator for absorbing heat from said freezing chamber and thereby effecting formation of ice in said freezing chamber, wherein said second means comprises by-pass means including valve means and being effective when said valve means is closed for maintaining normal operation of said refrigerating system and effective when said valve means is opened for diverting refrigerant from said compressor directly to said evaporator by-passing said condenser and said expansion valve, and valve control means for opening said valve means upon rotation of said transmission housing upon said output shaft against the bias imposed by said biasing means, whereupon refrigerant from said compressor passing directly to said evaporator promotes thawing of ice in said freezing chamber.

4. The combination in an ice forming apparatus according to claim 3, wherein said valve control means comprises electrical circuit means including a normally opened switch arranged to be closed upon rotation of said transmission housing upon said output shaft against the bias imposed by said biasing means, a relay energized through said switch when said switch is closed and deenergized when said switch is opened, and a solenoid energized through said relay when said relay is in its deenergized state and deenergized when said relay is in its energized state, said valve means being normally opened, said solenoid being arranged to close said valve means when energized and to restore said valve means when deenergized.

5. The combination in an ice forming apparatus according to claim 4, in which apparatus said prime mover is an electrical motor, wherein said electrical motor is energized through said relay when said relay is in its deenergized state and deenergized when said relay is in its energized state, whereby said electrical motor is deenergized upon rotation of said transmission housing upon said output shaft against the bias imposed by said biasing means.

6. The combination in an ice forming apparatus according to claim 4, wherein said electrical circuit means further includes time-delay switch means effective for maintaining said relay in its energized state for a time delay following restoration of said normally opened switch.

7. The combination in an ice forming apparatus according to claim 6, wherein said time-delay switch means is arranged for a time delay of about one minute.

8. In an ice forming apparatus including a freezing chamber having a water inlet and an ice outlet and having a cylindrical freezing surface, a refrigerating system for effecting formation of ice on said freezing surface from water introduced through said water inlet, an auger rotatably mounted within said freezing chamber and adapted to remove ice from said freezing surface and to eject removed ice through said ice outlet, a prime mover for rotatably driving said auger, and transmission means between said auger and said prime mover for rotatably driving said auger from said prime mover the improvement wherein said transmission means comprises a transmission housing, an input shaft and an output shaft respectively journalled to the transmission housing in generally parallel relationship, a gear train arranged within said transmission housing to positively drive said output shaft from said input shaft, a first pulley arranged to be driven by said prime mover and a second pulley fixed to said input shaft, an endless belt engaging said first and second pulleys so as to drive said second pulley from said first pulley, and resilient biasing means for rotatably biasing said transmission housing upon said output shaft so as to tighten said endless belt against said first and second pulleys, the axis of said output shaft being fixed with respect to the axis of said first pulley, said endless belt being arranged to be lossened and thereby permitted to slip upon rotation of said transmission housing upon said output shaft against the bias imposed by said biasing means.

9. The improvement in an ice forming apparatus according to claim 8, wherein said gear train comprises an output gear fixed to said output shaft and a driving gear arranged to drive said output gear, whereby, upon braking of said output shaft while said input shaft is driven by said prime mover, said drive gear is forced to orbit around and upon said output gear thereby to cause said transmission housing to be rotated upon said output shaft against the bias imposed by said biasing means.

10. The improvement in an ice forming apparatus according to claim 8, in which apparatus said refrigerating system comprises a compressor for compressing refrigerant, a condenser for condensing refrigerant from said compressor, an expansion valve for expanding refrigerant from said condenser, and an evaporator for absorbing heat from said freezing chamber and thereby effecting formation of ice in said freezing chamber, wherein said apparatus further comprises by-pass means including valve means and being effective when said valve means is closed for maintaining normal operation of said refrigerating system and effective when said valve means is opened for diverting refrigerant from said compressor directly to said evaporator by-passing said condenser and said expansion valve, and valve control means for opening said valve means upon rotation of said transmission housing upon said output shaft against the bias imposed by said biasing means, whereupon refrigerant from said compressor passing directly to said evaporator promotes thawing of ice in said freezing chamber.

11. The improvement in an ice forming apparatus according to claim 10, wherein said valve control means comprises electrical circuit means including a normally opened switch arranged to be closed upon rotation of said transmission housing upon said output shaft against the bias imposed by said biasing means, a relay energized through said switch when said switch is closed and deenergized when said switch is opened, and a solenoid energized through said relay when said relay is in its deenergized state and deenergized when said relay is in its energized state, said valve means being normally opened, said solenoid being arranged to close said valve means when energized and to restore said valve means when deenergized.

12. The improvement in an ice forming apparatus according to claim 11, in which apparatus said prime mover is an electrical motor, wherein said electrical motor is energized through said relay when said relay is in its deenergized state and deenergized when said relay is in its energized state, whereby said electrical motor is deenergized upon rotation of said transmission housing upon said output shaft against the bias imposed by said biasing means.

13. The improvement in an ice forming apparatus according to claim 11, wherein said electrical circuit means further includes time-delay switch means effective for maintaining said relay in its energized state for a time delay following restoration of said normally opened switch.

14. The improvement in an ice forming apparatus according to claim 13, wherein said time-delay switch means is arranged for a time delay of about one minute.

References Cited

UNITED STATES PATENTS

| 2,867,987 | 1/1959 | MacLeod et al. | 62—71 |
| 3,059,444 | 10/1962 | Bickel et al. | 62—352 X |
| 3,108,449 | 10/1963 | Lents | 62—354 X |
| 3,191,398 | 6/1965 | Rader | 62—138 |

WILLIAM E. WAYNER, *Primary Examiner.*

U.S. Cl. X.R.

62—233, 354